United States Patent
Turtinen et al.

(10) Patent No.: US 11,129,180 B2
(45) Date of Patent: Sep. 21, 2021

(54) SCHEDULING REQUEST PROCEDURE WITH MULTIPLE SCHEDULING REQUEST CONFIGURATIONS

(71) Applicant: Nokia Technologies Oy, Espoo (FI)

(72) Inventors: Samuli Heikki Turtinen, Ii (FI); Benoist Pierre Sebire, Tokyo (JP); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/636,486

(22) PCT Filed: Aug. 11, 2017

(86) PCT No.: PCT/CN2017/097224
§ 371 (c)(1),
(2) Date: Feb. 4, 2020

(87) PCT Pub. No.: WO2019/028884
PCT Pub. Date: Feb. 14, 2019

(65) Prior Publication Data
US 2020/0245345 A1    Jul. 30, 2020

(51) Int. Cl.
*H04W 74/04*    (2009.01)
*H04W 72/12*    (2009.01)
(Continued)

(52) U.S. Cl.
CPC ... *H04W 72/1263* (2013.01); *H04W 28/0278* (2013.01); *H04W 72/1242* (2013.01); *H04W 74/02* (2013.01); *H04W 74/0808* (2013.01)

(58) Field of Classification Search
CPC ......... H04W 28/0278; H04W 72/1242; H04W 72/1263; H04W 74/02; H04W 74/04; H04W 74/0808
(Continued)

(56) References Cited

U.S. PATENT DOCUMENTS 10,999,839 B2 *   5/2021   Dinan ............... H04W 72/1284
2013/0044699 A1 * 2/2013   Eriksson ........... H04W 72/1289
                                                         370/329
(Continued)

FOREIGN PATENT DOCUMENTS

CN    104170493 A    11/2014
EP    3 030 033 A1    6/2016
(Continued)

*Primary Examiner* — Nathan S Taylor
(74) *Attorney, Agent, or Firm* — Harrington & Smith

(57) ABSTRACT

Various communication systems may benefit from the appropriate handling of scheduling requests. For example, certain wireless communication systems may benefit from a scheduling request procedure involving multiple scheduling request configurations. A method can include transmitting, by a device, a first scheduling request at a first time. The method can also include setting, by the device, a timer from the first time prohibiting subsequent scheduling requests for a predetermined duration based on the transmission of the first scheduling request. The method can further include Identifying, by the device, a trigger for a new scheduling request subsequent to the first scheduling request. The method can additionally include modifying the timer based on the new scheduling request.

16 Claims, 2 Drawing Sheets

(51) Int. Cl.
    *H04W 28/02*     (2009.01)
    *H04W 74/02*     (2009.01)
    *H04W 74/08*     (2009.01)

(58) Field of Classification Search
    USPC .......................................................... 370/329
    See application file for complete search history.

(56) References Cited

U.S. PATENT DOCUMENTS

| | | | |
|---|---|---|---|
| 2015/0117342 A1* | 4/2015 | Loehr | H04W 72/1284 |
| | | | 370/329 |
| 2015/0373678 A1* | 12/2015 | Chou | H04L 5/0053 |
| | | | 370/329 |
| 2016/0099763 A1 | 4/2016 | Chen | |
| 2016/0270114 A1* | 9/2016 | Dinan | H04L 5/0091 |
| 2017/0064732 A1* | 3/2017 | Wu | H04L 5/0035 |
| 2017/0142749 A1* | 5/2017 | Kim | H04W 72/1289 |
| 2018/0049227 A1* | 2/2018 | Moon | H04W 72/1268 |
| 2018/0324635 A1* | 11/2018 | Babaei | H04W 24/10 |
| 2018/0368167 A1* | 12/2018 | Kim | H04W 28/0278 |
| 2020/0178282 A1* | 6/2020 | Yi | H04W 72/1284 |
| 2020/0196327 A1* | 6/2020 | Zhang | H04W 72/1242 |
| 2020/0196343 A1* | 6/2020 | Marinier | H04L 1/1854 |
| 2020/0275468 A1* | 8/2020 | Tang | H04W 72/1263 |
| 2020/0288494 A1* | 9/2020 | Heo | H04W 72/1278 |
| 2020/0322973 A1* | 10/2020 | Li | H04W 72/1268 |

FOREIGN PATENT DOCUMENTS

| | | |
|---|---|---|
| WO | WO 2016/144893 A1 | 9/2016 |
| WO | WO-2017-74437 A1 | 5/2017 |
| WO | WO 2017/086667 A1 | 5/2017 |

\* cited by examiner

SCHEDULING REQUEST PROCEDURE WITH MULTIPLE SCHEDULING REQUEST CONFIGURATIONS

CROSS REFERENCE TO RELATED APPLICATION

This patent application is a U.S. National Stage application of International Patent Application Number PCT/CN2017/097224 filed Aug. 11, 2017, which is hereby incorporated by reference in its entirety.

BACKGROUND

Field

Various communication systems may benefit from the appropriate handling of scheduling requests. For example, certain wireless communication systems may benefit from a scheduling request procedure involving multiple scheduling request configurations.

Description of the Related Art

In certain wireless communication systems, it is possible for there to be a relationship between multiple scheduling request (SR) configurations and logical channels (LCHs). For example, multiple SR configurations can be configured to a user equipment (UE). Moreover, which SR configuration is used depends on the LCH that triggers the SR.

A single bit SR with multiple SR configuration may be sufficient to distinguish the numerology/transmission time interval (TTI) length of the logical channel that triggers the SR.

In case multiple SRs are configured, for each LCH there is a mapping between LCHs and SR configuration. This mapping is configured by radio resource control (RRC) signaling. A logical channel can be mapped to none or one SR configuration.

The sr-ProhibitTimer information element can specify a time during which a UE that has sent a scheduling request is not supposed to send another SR, for example on physical uplink control channel (PUCCH).

In the long term evolution (LTE) system, SR can be configured on primary cell (PCell) and PUCCH secondary cell (SCell) but there is no mapping restriction for LCH to use which SR configurations. Any LCH associated to an LCG will trigger an SR which will be sent at the earliest occasion.

SUMMARY

According to certain embodiments, a method can include transmitting, by a device, a first scheduling request at a first time. The method can also include setting, by the device, a timer from the first time prohibiting subsequent scheduling requests for a predetermined duration based on the transmission of the first scheduling request. The method can further include identifying, by the device, a trigger for a new scheduling request subsequent to the first scheduling request. The method can additionally include modifying the timer based on the new scheduling request.

In certain embodiments, an apparatus can include means for transmitting, by a device, a first scheduling request at a first time. The apparatus can also include means for setting, by the device, a timer from the first time prohibiting subsequent scheduling requests for a predetermined duration based on the transmission of the first scheduling request. The apparatus can further include means for identifying, by the device, a trigger for a new scheduling request subsequent to the first scheduling request. The apparatus can additionally include means for modifying the timer based on the new scheduling request.

An apparatus, according to certain embodiments, can include at least one processor and at least one memory including computer program code. The at least one memory and the computer program code can be configured to, with the at least one processor, cause the apparatus at least to perform a process. The process can include the above-described method.

A computer program product can, according to certain embodiments, encode instructions for performing a process. The process can include the above-described method.

According to certain embodiments, a non-transitory computer-readable medium can be encoded with instructions that, when executed in hardware, perform a process. The process can include the above-described method.

BRIEF DESCRIPTION OF THE DRAWINGS

For proper understanding of the invention, reference should be made to the accompanying drawings, wherein.

DETAILED DESCRIPTION

When the logical channel (LCH) is assigned to a logical channel group (LCG), this assignment may trigger a buffer status report (BSR) to be reported upon new data arrival in the buffer and SR will be triggered when there is no UL grant for the BSR. With the LCH to SR configuration mapping restriction, it could happen that another SR is triggered with a different SR resource configuration when there is already an ongoing SR procedure. For example, an SR triggered by ultra-reliable low latency communication (URLLC) data arrival after SR procedure ongoing for enhanced mobile broadband (eMBB). Multiple parallel SR procedures would complicate the timer and counter maintenance, while aborting one is not necessary either, since as long as the next generation Node B (gNB) gets the earliest SR the gNB can schedule the UE and, based on the BSR, the gNB knows which LCHs have data in the buffer.

According to certain embodiments, the SR procedure on the user equipment (UE) side can be governed by a set of principles.

The SR procedure on the UE side can be governed by the following principles. For example, there may be only one SR procedure ongoing per medium access control (MAC) entity regardless of how many different SR configurations are associated to the LCH(s) with pending SR.

The set of SR occasions that can be used by the SR procedure can be the union of the SR occasions linked to the LCH having triggered the SR procedure. In other words, any new LCH triggering an SR while other SRs are pending can add the SR occasions linked to that LCH to the pool of SR occasions that can be used for the SR procedure.

The parameters SR_COUNTER and sr-ProhibitTimer can be defined per MAC entity. sr-ProhibitTimer can count the shortest periodicity of the SR configurations that are usable for all the LCHs that triggered the SR procedure, or pool as discussed above.

A new SR triggered by higher priority data for a different SR configuration that has lower value configured for sr-ProhibitTimer can stop or reset the sr-ProhibitTimer. Alternatively, upon any new SR trigger, or any new SR trigger that added a new SR configuration to the pool, the sr-ProhibitTimer and/or SR_COUNTER can be reset. Alternatively or additionally, if the new SR trigger adds a new SR configuration to the pool that has lower SR periodicity than with any other SR configuration in the pool, the sr-ProhibitTimer and/or SR_COUNTER can be reset.

Figure 1:
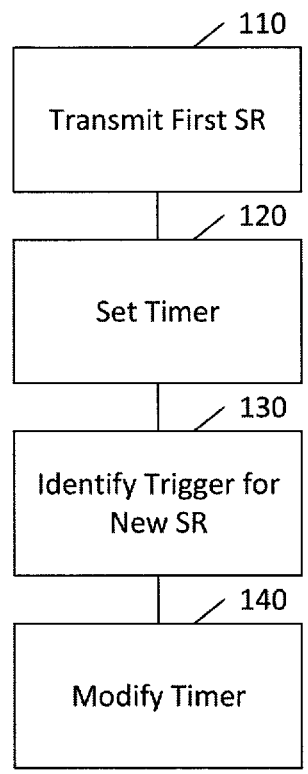
FIG. 1 illustrates a method according to certain embodiments.

FIG. 1 illustrates a method according to certain embodiments. As shown in FIG. 1, a method can include, at 110, transmitting, by a device, a first scheduling request at a first time. The method can also include, at 120, setting, by the device, a timer from the first time prohibiting subsequent scheduling requests for a predetermined duration based on the transmission of the first scheduling request. The method can further include, at 130, identifying, by the device, a trigger for a new scheduling request subsequent to the first scheduling request. The method can additionally include, at 140, modifying the timer based on the new scheduling request.

The modifying can include stopping the timer and/or resetting the timer. For example, when the new scheduling request is triggered by higher priority data for a different scheduling request configuration that has a lower value configured for the timer, the modifying can include stopping the timer and/or resetting the timer to one of the lower value, to initial value, or to zero. Similarly, when the new scheduling request is associated with a new scheduling request configuration, the modifying can include resetting the timer to one of the lower value, to initial value, or to zero.

The modifying can include the predetermined duration the timer prohibits scheduling request based on both the first scheduling request trigger and new scheduling request trigger, which is the shortest periodicity of the scheduling request configurations that are usable for all the logical channels that triggered the first scheduling request and the new scheduling request.

One logical channel can be mapped to one or a plurality of scheduling request configurations, including the first scheduling request configuration and at least one second scheduling request configuration.

The device can be configured to handle the first scheduling request configuration and the at least one second scheduling request configuration so that, when a logical channel assigned to a logical channel group lacks a mapping restriction or a mapping permitting to use at least one scheduling request configuration, a scheduling request triggered by the logical channel is permitted to use any scheduling request configuration.

The device can also be configured to handle the first scheduling request configuration and the at least one second scheduling request configuration so that a scheduling request mapping restriction is only applicable to a regular buffer status report triggered by higher priority data arrival as distinct from a scheduling request triggered by buffer status report retransmission.

The device can further be configured to handle the first scheduling request configuration and the at least one second scheduling request configuration so that there is only one scheduling request procedure ongoing per medium access control entity regardless of how many different scheduling request configurations are associated to any logical channels with at least one pending scheduling request.

Also, the device can be configured to handle the first scheduling request configuration and the at least one second scheduling request configuration so that usable scheduling request occasions comprise a union of all scheduling request occasions usable for any logical channel that triggered a scheduling request procedure.

Furthermore, the device can be configured to handle the first scheduling request trigger and a new scheduling request trigger so that the new scheduling request triggered by higher priority data than the first scheduling request stops or reset the sr-ProhibitTimer.

When an LCH is assigned to an LCG but not explicitly associated to any SR configuration, the LCH can use any of SR configurations signaled to the UE. Further, upon release of a SR configuration, any LCH mapped (only) to that specific SR configuration can use any of the remaining SR configurations unless otherwise signaled, for instance, by explicit mapping through RRC signaling. An LCH not assigned to any LCG does not need to be mapped to any SR as data arrival on that LCH may not trigger a BSR in MAC.

For retransmission BSR triggered SR (for example when retxBSR-Timer expires and an SR is subsequently triggered), any SR configuration could be used, regardless of which LCH triggered the original BSR. It is possible that the mapped SR did not go through and therefore led to the expiry of retxBSR-Timer. Alternatively, the SR configuration of the LCH that triggered the original BSR can be used.

In another implementation, for LCH default configuration (for example, signaling radio bearer (SRB) default configuration), a default SR configuration index number could be assigned. It is then up to the network (NW) to configure desired SR configuration for that configuration index when multiple SR configuration are signaled to the UE.

Figure 2:
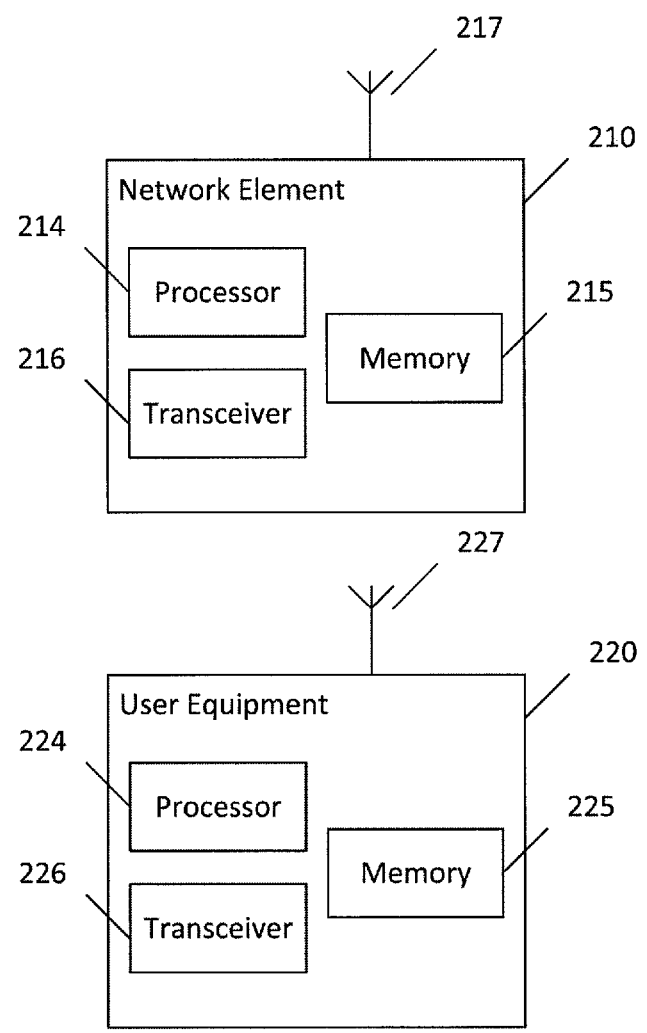
FIG. 2 illustrates a system according to certain embodiments.

FIG. 2 illustrates a system according to certain embodiments of the invention. It should be understood that each block of the flowchart of FIG. 1 may be implemented by various means or their combinations, such as hardware, software, firmware, one or more processors and/or circuitry. In one embodiment, a system may include several devices, such as, for example, network element 210 and user equipment (UE) or user device 220. The system may include more than one UE 220 and more than one network element 210, although only one of each is shown for the purposes of illustration. A network element can be an access point, a base station, an eNode B (eNB), or any other network element, such as a gNB. Each of these devices may include at least one processor or control unit or module, respectively indicated as 214 and 224. At least one memory may be provided in each device, and indicated as 215 and 225, respectively. The memory may include computer program instructions or computer code contained therein, for example for carrying out the embodiments described above. One or more transceiver 216 and 226 may be provided, and each device may also include an antenna, respectively illustrated as 217 and 227. Although only one antenna each is shown, many antennas and multiple antenna elements may be provided to each of the devices. Other configurations of these devices, for example, may be provided. For example, network element 210 and UE 220 may be additionally configured for wired communication, in addition to wireless communication, and in such a case antennas 217 and 227 may illustrate any form of communication hardware, without being limited to merely an antenna.

Transceivers 216 and 226 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 220 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 220 may be a sensor or smart meter, or other device that may usually be configured for a single location.

In an exemplifying embodiment, an apparatus, such as a node or user device, may include means for carrying out embodiments described above in relation to FIG. 1.

Processors 214 and 224 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 215 and 225 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 210 and/or UE 220, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 2 illustrates a system including a network element 210 and a UE 220, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, all the SR occasions of the SR configurations of the LCHs that triggered SR can be used in a single SR procedure. This may avoid the complexity of maintaining of multiple SR procedures with multiple set of timers and counters. Likewise, this may avoid unnecessarily aborting of an ongoing SR procedure. This may be beneficial as SR occasions of the aborted SR configuration may not be usable anymore.

Additionally, SRBs may not need to be specifically mapped to any SR configuration configured for the UE any later point during the connection but they can use any SR configuration. Moreover, there may be saved signaling overhead. For example, every LCH configuration may not need to include the LCH to SR configuration mapping. Furthermore, upon SR configuration release, no re-configuration of LCH configuration needs to be made.

Also, certain embodiments may allow efficient configuration of multiple SR configurations to a single LCH and without many optional fields needing to be introduced to the LCH configuration in the RRC signaling.

LCH mapped to no SR configuration may not trigger a random access channel (RACH) procedure upon data arrival when UE has an SR configuration.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LISTING OF ABBREVIATIONS

BSR Buffer Status Report
LCG Logical Channel Group
LCH Logical Channel
SR Scheduling Request
SRB Signaling Radio Bearer

What is claimed is:
1. A method, comprising:
transmitting, by a device, a first scheduling request at a first time;
setting, by the device, a timer from the first time prohibiting subsequent scheduling requests for a predetermined duration based on the transmission of the first scheduling request; and
identifying, by the device, a trigger for a new scheduling request subsequent to the first scheduling request, wherein one logical channel is mapped to one or more scheduling request configurations, including the first scheduling request configuration and a second scheduling request configuration, and wherein the device is configured to handle the first scheduling request configuration and the second scheduling request configuration so that, based on a logical channel assigned to a logical channel group lacking a mapping restriction, a scheduling request triggered by the logical channel is permitted to use any scheduling request configuration.

2. The method of claim 1, wherein modifying comprises stopping the timer.

3. The method of claim 1, wherein modifying comprises resetting the timer.

4. The method of claim 1, wherein when the new scheduling request is triggered by higher priority data for a different scheduling request configuration that has a lower value configured for the timer, the modifying comprises stopping the timer or resetting the timer to the lower value.

5. The method of claim 1, wherein when the new scheduling request is associated with a new scheduling request configuration, the modifying comprises resetting the timer to one of the lower value, initial value, or zero.

6. The method of claim 1, wherein modifying comprises the predetermined duration the timer prohibits scheduling request based on both the first scheduling request trigger and new scheduling request trigger, which is the shortest periodicity of the scheduling request configurations that are usable for all the logical channels that triggered the first scheduling request and the new scheduling request.

7. The method of claim 1, wherein the device is configured to handle the first scheduling request configuration and the second scheduling request configuration so that a scheduling request mapping restriction is only applicable to a regular buffer status report triggered by higher priority data arrival as distinct from a scheduling request triggered by buffer status report retransmission.

8. The method of claim 1, wherein the device is configured to handle the first scheduling request and the new scheduling request so that there is only one scheduling request procedure ongoing per medium access control entity regardless of how many different scheduling request configurations are associated to any logical channels with at least one pending scheduling request.

9. The method of claim 1, wherein the device is configured to handle the first scheduling request and the new scheduling request so that usable scheduling request occasions comprise a union of all scheduling request occasions usable for any logical channel that triggered the scheduling request procedure.

10. The method of claim 1, wherein the device is configured to handle the first scheduling request and the new scheduling request so that the new scheduling request triggered by higher priority data than the first scheduling request stops sr-ProhibitTimer.

11. An apparatus, comprising:
at least one processor; and
at least one memory including computer program code,
wherein the at least one memory and the computer program code are configured to, with the at least one processor, cause the apparatus at least to perform transmitting, by a device, a first scheduling request at a first time;

setting, by the device, a timer from the first time prohibiting subsequent scheduling requests for a predetermined duration based on the transmission of the first scheduling request; and identifying, by the device, a trigger for a new scheduling request subsequent to the first scheduling request, wherein one logical channel is mapped to one or more scheduling request configurations, including the first scheduling request configuration and a second scheduling request configuration, and wherein the device is configured to handle the first scheduling request configuration and the second scheduling request configuration so that, based on a logical channel assigned to a logical channel group lacking a mapping restriction, a scheduling request triggered by the logical channel is permitted to use any scheduling request configuration.

12. The apparatus of claim 11, wherein modifying comprises one of stopping the timer or resetting the timer.

13. The apparatus of claim 11, wherein when the new scheduling request is triggered by higher priority data for a different scheduling request configuration that has a lower value configured for the timer, the modifying comprises stopping the timer or resetting the timer to the lower value.

14. The apparatus of claim 11, wherein when the new scheduling request is associated with a new scheduling request configuration, the modifying comprises resetting the timer to one of the lower value, initial value, or zero.

15. The apparatus of claim 11, wherein modifying comprises the predetermined duration the timer prohibits scheduling request based on both the first scheduling request trigger and new scheduling request trigger, which is the shortest periodicity of the scheduling request configurations that are usable for all the logical channels that triggered the first scheduling request and the new scheduling request.

16. A non-transitory computer-readable medium encoded with instructions that, when executed in hardware by at least one processor, perform: transmitting, by a device, a first scheduling request at a first time;

setting, by the device, a timer from the first time prohibiting subsequent scheduling requests for a predetermined duration based on the transmission of the first scheduling request; and identifying, by the device, a trigger for a new scheduling request subsequent to the first scheduling request, wherein one logical channel is mapped to one or more scheduling request configurations, including the first scheduling request configuration and a second scheduling request configuration, and wherein the device is configured to handle the first scheduling request configuration and the second scheduling request configuration so that, based on a logical channel assigned to a logical channel group lacking a mapping restriction, a scheduling request triggered by the logical channel is permitted to use any scheduling request configuration.

* * * * *